United States Patent
Christopher

(10) Patent No.: US 7,137,330 B2
(45) Date of Patent: Nov. 21, 2006

(54) VEHICLE SEAT ADJUSTMENT WITH ACTUATOR ISOLATION VALVES

(75) Inventor: Hugh H. Christopher, West Bridgford (GB)

(73) Assignee: Lear Corporation, Southfield, MI (US)

( * ) Notice: Subject to any disclaimer, the term of this patent is extended or adjusted under 35 U.S.C. 154(b) by 39 days.

(21) Appl. No.: 10/996,864

(22) Filed: Nov. 24, 2004

(65) Prior Publication Data
US 2005/0092168 A1    May 5, 2005

(30) Foreign Application Priority Data
Oct. 22, 2003 (GB) ................. 0324558.6
Jan. 13, 2004 (GB) ................. 0400604.5

(51) Int. Cl.
*F15B 13/01* (2006.01)
*F15B 13/04* (2006.01)

(52) U.S. Cl. .................. 91/420; 91/278

(58) Field of Classification Search .......... 91/265, 91/278, 420, 268; 60/470, 474, 387
See application file for complete search history.

(56) References Cited

U.S. PATENT DOCUMENTS

| | | | |
|---|---|---|---|
| 2,684,108 A * | 7/1954 | Rappl | 91/45 |
| 2,760,552 A * | 8/1956 | Decker | 60/478 |
| 2,974,998 A * | 3/1961 | Himka | 60/387 |
| 3,218,019 A * | 11/1965 | Elfes et al. | 60/470 |
| 3,470,692 A * | 10/1969 | Kamp | 60/469 |
| 3,760,911 A | 9/1973 | Porter et al. | |
| 3,777,617 A | 12/1973 | Okiyama | |
| 3,860,098 A | 1/1975 | Porter et al. | |
| 3,927,911 A | 12/1975 | Rosquist | |
| 4,550,750 A | 11/1985 | Korth | |
| 4,720,143 A | 1/1988 | Schwartz et al. | |
| 5,435,625 A | 7/1995 | Weber | |
| 5,743,591 A | 4/1998 | Tame | |
| 6,015,130 A | 1/2000 | Kigel | |
| 6,047,797 A | 4/2000 | Popjoy | |
| 6,059,253 A | 5/2000 | Koutsky et al. | |
| 6,142,564 A | 11/2000 | Pajela et al. | |
| 6,161,633 A | 12/2000 | Broom | |
| 6,382,491 B1 | 5/2002 | Hauser et al. | |
| 2002/0130542 A1 | 9/2002 | Ellerich et al. | |
| 2003/0209929 A1 | 11/2003 | Muin et al. | |

FOREIGN PATENT DOCUMENTS

| | | |
|---|---|---|
| DE | 202 15 969 | 2/2003 |
| DE | 101 52 561 | 5/2003 |
| EP | 0 316 675 | 5/1989 |
| EP | 0 878 348 | 11/1998 |
| EP | 1 077 153 | 2/2001 |

(Continued)

*Primary Examiner*—Igor Kershteyn
(74) *Attorney, Agent, or Firm*—MacMillan, Sobanski & Todd, LLC

(57) ABSTRACT

A fluid powered vehicle seat adjustment system comprising a fluid actuator a source of pressurized hydraulic fluid and a controller. The fluid actuator including first and second inlet/outlet conduits, and the controller selectively controlling and directing pressurized fluid selectively to either the first or second inlet/outlets of the actuator. The actuator further comprising actuator isolation valves associated with each of the first and second inlet/outlets of the actuator. Each actuator isolation valve allowing a flow of fluid from the actuator only when pressurized fluid is supplied to the actuator and other isolation valve in order to prevent movement of the actuator except when pressurized fluid is supplied to the actuator.

20 Claims, 4 Drawing Sheets

FOREIGN PATENT DOCUMENTS

| | | |
|---|---|---|
| EP | 1 188 608 | 3/2002 |
| GB | 897955 | 6/1962 |
| GB | 2 167 494 | 5/1986 |
| GB | 2 173 344 | 10/1986 |
| GB | 2 365 947 | 2/2002 |
| JP | 2000-289507 | 10/2000 |
| WO | 03/026921 | 4/2003 |

* cited by examiner

VEHICLE SEAT ADJUSTMENT WITH ACTUATOR ISOLATION VALVES

CROSS REFERENCE TO RELATED APPLICATIONS

This application claims priority to Great Britain Patent Application No. 0400604.5 filed Jan. 13, 2004, the disclosures of which are incorporated herein by reference, and Great Britain Patent Application No. 0324558.6 filed Oct. 22, 2003, the disclosures of which are incorporated herein by reference.

BACKGROUND OF THE INVENTION

The present invention relates to a vehicle seats, and in particular to hydraulically or fluid powered adjustable automotive vehicle seats.

Adjustable vehicle seats are provided to comfortably accommodate various sizes and shapes of vehicle occupants. Typically at least the fore and aft position of the seat along with the angle of the seat back are adjustable via suitable adjustment and locking mechanisms. Other adjustment of the seat position, and/or parts of the seat, for example adjustment of the seat height and/or tilt, or of the headrest or lumber support position, may also be provided. The seat adjustment mechanisms may be manually operable, or increasingly some or all may be power operated. Conventionally such power operated adjustment mechanisms comprise separate individual electric motors mounted within the seat driving each adjustment mechanism though suitable gearing.

Hydraulic or fluid powered seat adjustment mechanisms in which pressurised fluid provided from a pump, is supplied via a control valve to piston/cylinder actuators to adjust the position of the seat or portions of the seat, have been proposed instead of electric powered systems. Indeed the earliest of such proposals date back a number of years. An example of such a powered hydraulic adjustment systems is described in U.S. Pat. No. 5,435,625. A simple telescopic powered hydraulic seat height adjustment arrangement is briefly described in GB 2,167,494.

Hydraulic or fluid powered arrangements offer the prospect of extremely quiet, near silent, operation, without the noisy mechanical gearing. Smooth and almost infinitely variable adjustment is also possible with such hydraulic powered arrangements.

In spite of these, and other, advantages of hydraulically powered seat adjustments have not been adopted for widespread automotive vehicle seat use over the considerable number of years since they have initially been proposed. Overall, and although hydraulics are used in other areas in automotive vehicles (for example braking systems), and also in non automotive fields, those skilled in the art of vehicle seat design would not generally from a practical stance consider using hydraulic powered seat adjustment systems. Indeed the conventional trend is away from hydraulics in general in automotive applications and to electric powered systems. A distinction should also be drawn between hydraulic or fluid powered adjustment systems, and the more basic and simple hydraulic locking systems and/or damper arrangements.

A particular problem with seat adjustment arrangements, and in particular fluid powered arrangements, for automotive use is to provide adequate locking of the seat adjustment. For automotive use it is a requirement that the seat and seat portions once set are securely locked and fixed under all operating conditions and especially in the event of a vehicle crash. In a vehicle crash or impact large forces can be applied to the seat and seat portions which can generate extremely high pressures within a hydraulic adjustment system, which are significantly above the normal operating pressures and for example may be in the region of 1700 bar. The adjustment system must be capable of withstanding these pressures and maintain the locked position of the seat or seat portion. As a result the pipework, pump, actuators, and control valve need to be significantly oversized, and built to a much higher quality, than is required to simply withstand the normal operating conditions and pressure. This increases the resultant costs. In addition even under normal operating conditions leakage from or within the pipework, control valve and pump can undesirably result in movement of the set seat positions. To prevent this the seals within the pump, pipework and control valves must be built to a high quality and standard with resultant cost implications.

To address the problems associated with crash loading and the high pressures generated in fluid powered adjustment systems it has been proposed in co-pending UK patent application number 0324558.6, in the name of Lear Corporation, to incorporate system protection valves within the actuator. These system protection valves are adapted to be activated in the event of the pressure within the actuator exceeding a predetermined level and close off the inlet and outlet of the actuators. This isolates or limits the transmission of high pressures from the actuator to the remainder of the hydraulic system to protect the remainder of the hydraulic system from the excessive pressure which may be generated in the actuators in the event of crash loading. Whilst such system protection valves provide an improvement, and limit the pressures to which the remainder of the hydraulic system is subjected, thereby reducing costs, they do not address the potential problems of locking the actuators during normal use when leakage through the control valves or other associated parts may allow the actuator to undesirably move.

U.S. Pat. Nos. 5,743,591, 3,760,911, 3,860,098 and 6,161,633 all disclose various manually operated, unpowered, hydraulic adjustable seat locking arrangements incorporating various manually activated control valves. U.S. Pat. No. 5,743,591further includes a crash sensing system which is normally open and closes in a crash condition. None of these prior proposals however address the above described specifc problems. U.S. Pat. Nos. 6,015,130 and 3,777,617 described non automotive hydraulically adjustable chair arrangements which are very different from automotive adjustable seats and automotive seat requirements. U.S. Pat. No. 5,076,647 discloses a relief valve although this is for a brake system.

SUMMARY OF THE INVENTION

It is a desirable object of the invention to provide an improved fluid powered automotive vehicle seat adjustment system which addresses the above described problems and/or which offers improvements generally.

According to the present invention there is provided a fluid powered vehicle seat adjustment system as described in the accompanying claims.

In an embodiment of the invention there is provided fluid powered vehicle seat adjustment system comprising a fluid actuator which includes a pair isolation valves. Each isolation valve is adapted to allow a flow of fluid from the actuator only when pressurised fluid is supplied to the other isolation valve.

In particular the fluid powered vehicle seat adjustment system comprises a fluid actuator, a source of pressurised hydraulic fluid, and a controller. The fluid actuator includes a first inlet/outlet conduit and a second inlet/outlet conduit. The actuator is responsive to pressurised fluid directed to and from the first and second inlet/outlets. The controller selectively controls and directs pressurised fluid selectively to either the first or second inlet/outlets of the actuator. The actuator further comprises a first actuator isolation valve associated with the first inlet/outlet of the actuator and a second actuator isolation valve associated with the second inlet/outlet of the actuator. The first and second actuator isolation valves are biassed towards a closed position to close off the respective inlet/outlets and prevent a flow of hydraulic fluid from the actuator through the inlet/outlets, and are adapted to each open and allow a flow of fluid from the actuator via the respective inlet/outlet in response to pressurised fluid being supplied to the other actuator isolation valve of the actuator.

The actuator isolation valves isolate the actuator from the remainder of the system and prevent flow of fluid from the actuator except when an adjustment is required and pressurised fluid is supplied. As a result the actuator and so seat position is more securely locked and fixed locally at the actuator, with the possibility of uncontrolled movement of the seat due to leakage from the remainder of the system reduced. The remainder of the system, by the isolation of the actuator is also protected and isolated from any high pressures which may be generated within the actuator during crash loading. Accordingly the remainder of the system does not need to be manufactured to such a high quality and strength to eliminate leakage and/or withstand high pressures generated during crash loading. This reduces costs.

Preferably the actuator isolation valves comprise a non-return valve which can be selectively operated to allow a return flow. In particular the non-return valve of one of the first and second actuator isolation valves is selectively operated in response to pressurised fluid supplied to the other of the first and second actuator isolation valves.

The actuator isolation valves are preferably operatively interconnected. Specifically there may be an interconnecting control conduit to interconnect the first and second actuator isolation valves and direct pressurised fluid supplied to one of the first and second actuator isolation valves to the other of the first and second actuator isolation valves.

The actuator isolation valves preferably each comprise a moveable valve member which is moveable from the closed position to close off the respective inlet/outlet to an open position to allow a flow of fluid via the inlet/outlet. In particular the actuator isolation valves may comprise a ball valve which seats against a seat to close off the respective inlet/outlet.

The actuator isolation valves may further comprise a moveable piston which moves in response to pressurised fluid supplied to the actuator to open the actuator isolation valve and allow a flow of fluid from the actuator via the inlet/outlet.

DETAILED DESCRIPTION OF THE INVENTION

The present invention is an improvement and development of the hydraulic seat adjustment system described in co-pending UK patent application number 0324558.6 which is incorporated in its entirety herein by reference.

Figure 1:
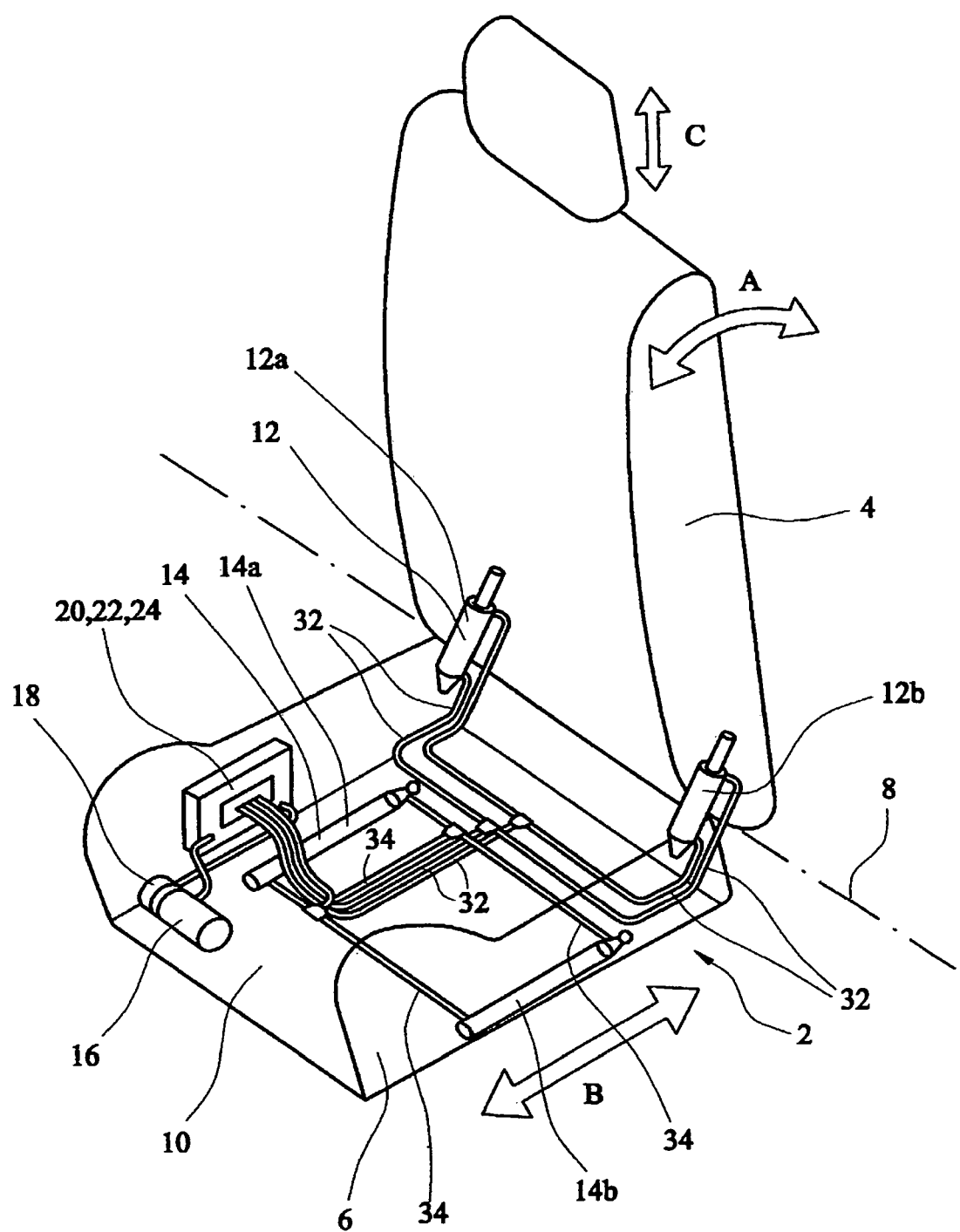
FIG. 1 is a schematic perspective illustration showing the general disposition of a hydraulic vehicle adjustment system within a vehicle seat.

Referring to FIG. 1 there is shown a schematic illustration of the disposition of a hydraulically powered seat adjustment system 10 within an outline of an automotive vehicle seat 2.

The vehicle seat 2 includes a seat back 4 which is pivotally connected to a bottom seat cushion 6, in a conventional manner, at one end about a horizontal lateral axis 8. The angle of the seat back 4 can accordingly be adjusted relative to the generally horizontally disposed seat bottom cushion 6 as indicated by arrow A. A pair of seat pivot hydraulic actuators 12a, 12b, one on each lateral side of the seat 2, are operatively connected between the seat back 4 and seat bottom cushion 6 to adjust, control, and set the angle of the seat back 4.

The seat bottom cushion 6 is slidably mounted to the vehicle floor (not shown) in a conventional manner, for example using a pair of sliding seat tracks or rail assemblies (not shown). This allows the seat cushion 6 and seat 2 to be slid fore and aft as indicated by arrow B. A pair of seat track hydraulic actuators 14a, 14b are provided to adjust and set the fore and aft position of the seat bottom cushion 6 and seat 2 along the rail assemblies and within the vehicle.

It will be appreciated that the seat 2 may be, and preferably is, mounted to provide for other movement and adjustment for example to adjust the height of the vehicle seat 2, and/or angle and tilt of the seat bottom cushion 6. The seat 2 may also include further movable portions for example a movable headrest (as indicated by arrow C), and/or adjustable lumber support. Further pairs of actuators, or single actuators, may accordingly be similarly provided for such further adjustable mountings and/or movable portions.

Figure 2:
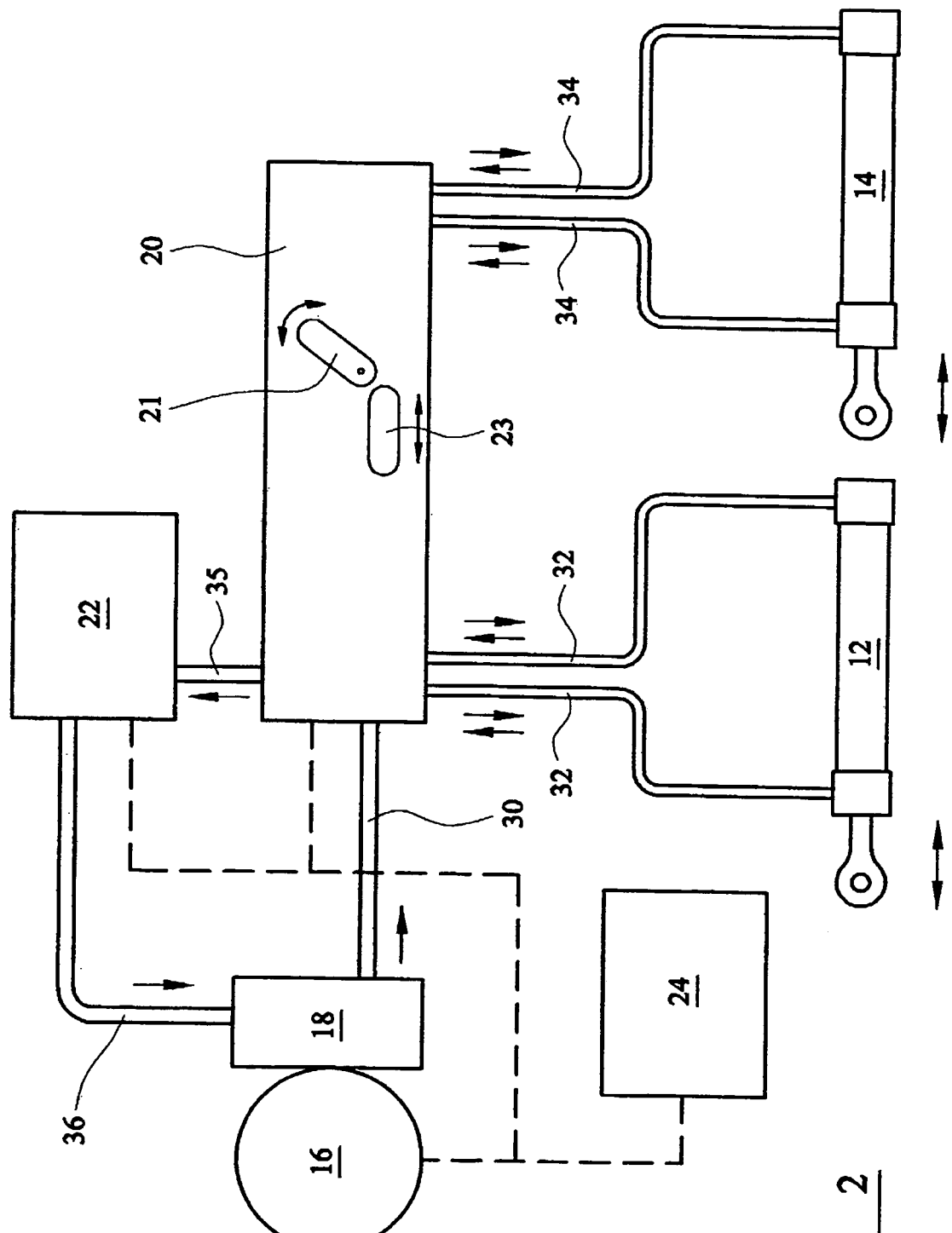
FIG. 2 is a schematic simplified functional illustration of the hydraulic vehicle adjustment system of FIG. 1.

The hydraulic adjustment system 10, and the hydraulic circuit, is shown more clearly in simplified schematic form in FIG. 2. In FIG. 2 only one actuator 12,14 of each of the pair of actuators 12a, 12b, 14a, 14b is shown for simplicity. The other actuators of the pairs of actuators 12a, 12b, 14a, 14b shown in FIG. 1 are connected in parallel with the respective illustrated actuator.

The hydraulic adjustment system 10 comprises a hydraulic pump 18 driven by an electric motor 16. The pump 18 is connected to and in fluid communication with a control module 20. The pump 18 supplies pressurised hydraulic fluid via a supply pipe 30 to the control module 20. The control module 20 includes control valves (not shown) which selectively in use direct and control a flow pressurised fluid supplied from the control module 20 to the respective hydraulic actuators 12, 14 via actuator supply/return pipes 32, 34. The control valves are activated by switches 21, 23 operated by a user. Supply/return pipes 32, 34 also return the hydraulic fluid from the hydraulic actuators 12, 14 via the control module 20, and the control valves 40, to a reservoir 22 which stores an operating quantity of hydraulic fluid. The hydraulic fluid is supplied from the reservoir 22 to the pump 18 via a pump feed pipe 36 completing the hydraulic circuit.

To adjust, for example, the angle of, and recline, the seat back 4 a seat occupant operates the respective switch 21 of the control module 20 mounted and located on the side valance of the seat 2. This operates the respective control valves within the control module 20 to interconnect and direct hydraulic fluid from the supply pipe 30 to one of the supply/return pipes 32 connected to the seat pivot actuator 12, and to interconnect and direct hydraulic fluid from the other of the supply/return 32 pipes from the seat pivot actuator 12 to the return pipe 35. At the same time the switch 21, movement of the valves, or the pressure change in the supply pipe 30 activates the motor 16 and pump 18 to generate a flow of pressurised hydraulic fluid which is supplied and directed to the seat pivot actuator 12 causing the actuator 12 to extend and recline the seat back 4. Once the desired reclined position is achieved the occupant releases the switch 21, which closes the valves and stops the pump 18. The closed valves prevent flow of fluid from the supply/return pipes 32 thereby preventing further movement of the seat pivot actuator 12 and so secure and lock the seat back 4 in the desired position. To move the seat back 4 to a more upright position the switch 21 is moved in the opposite sense, or a second switch is pressed, which operates the valves to direct and interconnect the supply/return pipes 32 to the supply 30 and return 35 in the opposite manner to produce an opposite flow of hydraulic fluid such that the pivot actuator 12 retracts moving the seat back 4 to a more upright position. Adjustment of the fore and aft position and seat track actuators 14, as well as any other adjustment provided by any further actuators is similar.

The hydraulic circuit preferably operates at a relatively low hydraulic pressure, typically 20 bar and can be contrasted with conventional hydraulic systems which generally operate at much higher pressures. This low operating pressure reduces costs since the system primarily only needs to be sized to accommodate this low pressure, and at such a low pressure sealing is much simpler than at higher pressures.

The control module may comprise the control module as described in co-pending UK patent application number 0324552.9 filed on 22 Oct. 2003 the contents of which are incorporated in their entirety herein by reference.

An electronic control unit 24 is preferably operatively connected to the motor 16, control module 20 and various other sensors (not shown), to monitor and control the operation of the hydraulic adjustment system 10. The electronic control 24 unit may also include a memory unit to store previously set seat positions for different occupants and a control unit arranged to operate (via suitable solenoids) the control valves in place of, or in addition to, the manual switches 21,23. Such electronic control units 24 with memory units and arranged to operate powered seat adjustment systems are in themselves known in the art for use with conventional electromechanical seat adjustment systems and can be adopted and used with the above described hydraulic system 10.

Figure 3:
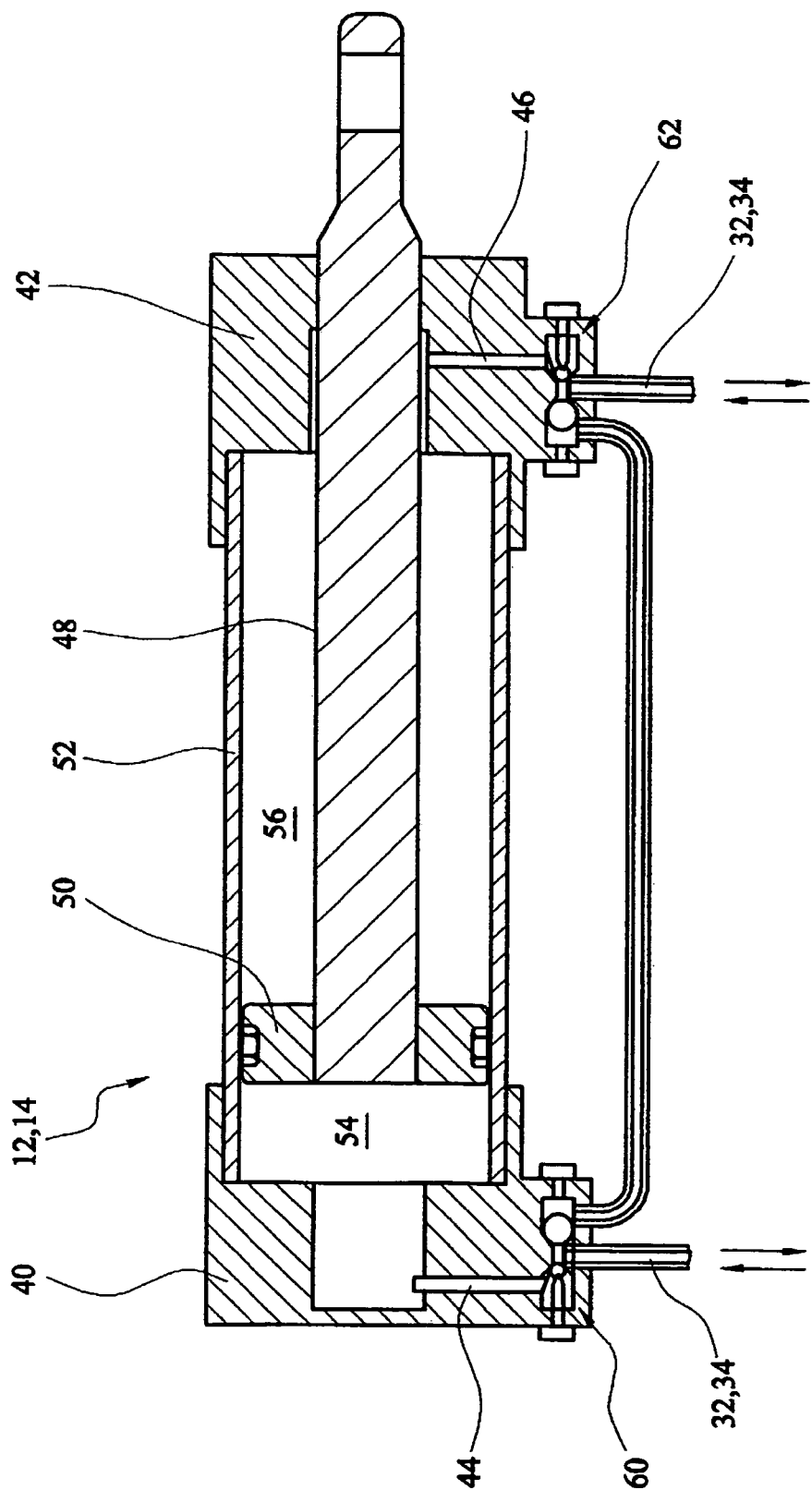
FIG. 3 is an illustrative more detailed cross section through one of the actuators shown generally in FIGS. 1 and 2.

The hydraulic actuators 12,14 comprise a hydraulic piston 50 mounted within a cylinder 52 defining separate chambers 54,56 on either side of the piston 50 as shown in FIG. 3. The cylinder 52 is closed off by end caps 40,42. The piston 50 is connected to a piston rod 48 which extends axially through one of the end caps 42. The end of the piston rod 48 and actuator 12,14 are operatively attached to the seat or seat portions to be adjusted, for example between the seat bottom cushion 6 and floor, or between the seat bottom cushion 6 and seat back 4 such that extension and retraction of the actuator 12,14 adjusts the seat or seat portion position. Ducts 44,46 defined within the respective end caps 40,42 connect to and provide inlet/outlets to the respective chambers 54,56 of the actuator 12,14. A pair of actuator isolation valve assemblies 60,62, one at each end and for each duct 44,46, selectively close off the respective ducts 44,46 as will be explained in further details below. The supply/return pipes 32,34 are connected to respective ends of the actuator 12,14 to supply and return hydraulic fluid to and from the chambers 54,56 on either side of the piston 50 via the actuator isolation valve assemblies 60,62. The actuator 12,14, and in particular piston rod 48, extends and retracts in response to hydraulic fluid supplied and flowing to and from the actuator 12,14 via the supply/return pipes 32,34 and into and out of the chambers 54,56 of the actuator 12,14. Extension and retraction of the actuator 12,14 adjusts the position of the seat 2 or respective seat portion 4,6 to which the actuator 12,14 is connected.

Figure 4:
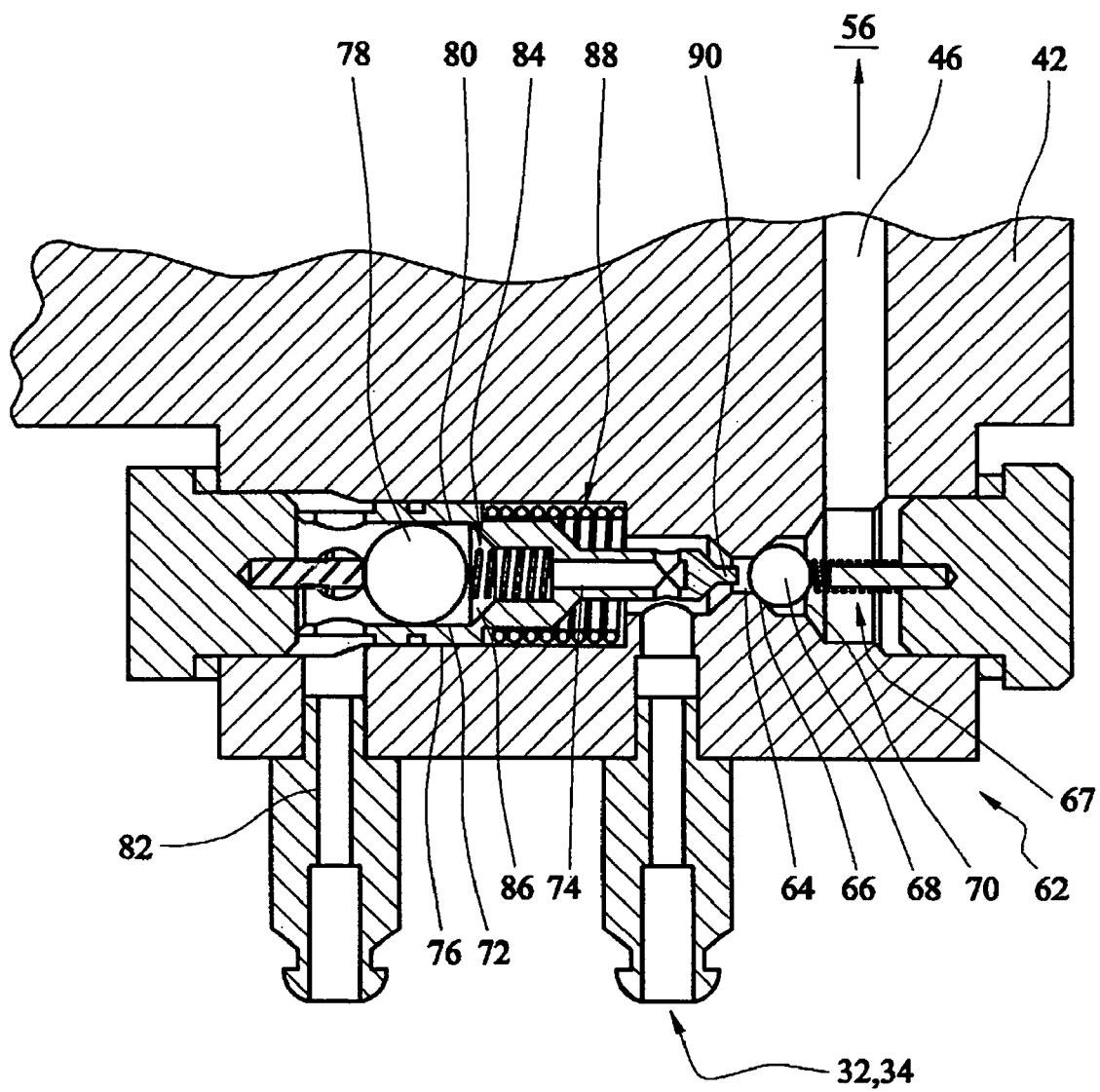
FIG. 4 is a further more detailed cross sectional view of the isolation valve at one end of the actuator shown in FIG. 3.

Both of the actuator isolation valve assemblies 60,62 of each actuator 12,14 are similar, and one of the actuator isolation valve assemblies 62 is shown in more detail in FIG. 4. As shown the actuator isolation valve assembly 62 includes a ball valve 70 comprising a ball 68 which is biassed and urged by a coil biassing spring 67 to seat and abut against an annular seat face 66 around a central flow passage 64 interconnecting the inlet/outlet duct 46 to the supply/return pipe 32,34 to thereby close off the flow passage 64. The ball valve 70 is thereby biassed to, and normally, prevents a flow of hydraulic fluid from the actuator chamber 56 through the duct 46 to the supply/return pipes 32,34. The hydraulic fluid is accordingly contained within the actuator 12,14 and actuator chamber 56 thereby preventing movement of the piston 50, actuator and respective seat adjustment.

When, during powered seat adjustment, pressurised hydraulic fluid is supplied to the actuator 12,14 via one of the supply/return ducts 32,34 the pressurised hydraulic fluid acts on the ball 68, overcoming the biassing force of the biassing spring 67 unseating the ball 68 from the seat face 66 and allowing the pressurised hydraulic fluid to freely flow via the flow passage 64 into the inlet/outlet duct 46 and into the actuator 12,14 and actuator chamber 56. At the same time the pressurised hydraulic fluid supplied from the supply/return duct 32,34 flows into and through a central axial bore 74 defined within an isolating valve piston 72 slidably mounted within a isolating valve bore 76, over and around a piston ball 78 located within the piston bore 80 and across to a control port 82 of the isolating valve assembly 62. The control port 82 of the first isolating valve assembly 62 is connected via an interconnecting pipe or duct 84 to a corresponding control port 82 of the other, second, actuator isolating valve assembly 60 of the actuator 12,14. The pressurised hydraulic fluid thereby supplied to the control port 82 of the second actuator isolating valve assembly 60 from the first isolating valve assembly 62 urges the second piston ball 78 of the second isolating valve assembly 60 piston 72 (to the right as shown in FIG. 4) against its biassing spring 84 (which may be omitted to improve sensitivity and response) to seat against a piston seat face 86. This seals off the central bore 74 of the piston 72 of the second isolating valve 60 such that the pressurised hydraulic fluid supplied to the second actuator control port 82 is applied to the whole of the end of the piston 72 of the second isolating valve assembly 60. This moves and urges the piston 72 axially (to the right as shown in FIG. 4) against its biassing spring 88 towards the ball 68 of the ball valve assembly 70 of the second isolating valve assembly 60 such that a tip end 90 of the piston 72 abuts against and unseats the ball 68 from its seat 66 against its biassing spring 67. The piston 72 thereby acts as an operating, and override element and means to operate and open the ball valve 70 and isolating valve 60,62, overriding the normal biassing of the valve 70 to the closed position for flow from the actuator and actuator chamber 56. As a result the ball valve 70 of the second isolating valve 60 is automatically opened and hydraulic fluid can then flow from the chamber 54 via the inlet/outlet duct 44 through the flow passages 64 of the second actuator isolating valve 60 to the supply/return pipe 32,34. This enables the actuator piston 50 to move, as shown in FIG. 3 to the left, and retracts the actuator 12,14 as pressurised hydraulic fluid flows into the right hand chamber 56 and out of the left hand chamber 54.

When pressurised hydraulic fluid is supplied to the other of the supply and return ducts 32,34 for the opposite movement and adjustment, the above described operation is simply reversed with the pressurised hydraulic fluid supplied at the second isolating valve opening the first isolating valve to allow hydraulic fluid to then flow out from the actuator chamber 56, and extension of the actuator 12,14.

This arrangement of actuator isolating valve assemblies 60,62 isolates the actuator 12,14 from the remainder of the hydraulic adjustment system 10 when no pressurised hydraulic fluid is supplied to the actuator (i.e. in the normal fixed non operative position) and prevents the flow of hydraulic fluid from the actuator 12,14. As a result the actuator 12,14 position, and so seat adjustment position, is thereby securely fixed and the actuator 12,14 locked regardless of any leakage from the remainder of the system 10. When pressurised fluid is then supplied to one of the supply/return pipes 32,34 to operate the actuator 12,14 and provide a required seat adjustment the respective isolating valve assembly 60,62 allows the pressurised fluid to flow into the actuator 12,14 whilst automatically also operating and opening the other isolating valve assembly 62,60 to enable hydraulic fluid to flow from the actuator 12,14 allowing the actuator 12,14 to extend or retract as required in response to the supplied pressurised hydraulic fluid. Once the supply of pressurised hydraulic fluid is terminated the isolating valve assemblies 60,62, by virtue of the biassing adopt their normal positions (as shown in FIG. 4) closing off and isolating and locking the actuator 12,14 again.

The actuator isolating valve assemblies 60,62 thereby act in addition to the control valves of the control module 20 to more securely lock the actuator 12,14 and securely fix and lock the position of the seat 2 or respective seat portion 4,6 to which the actuators 12,14 are connected. In addition the isolating valve assemblies 60,62 isolate and protect the remainder of the hydraulic system 10 from any high pressure which may be generated within the actuator and actuator chambers 54,56 in the event of and due to crash loading. Indeed in such a case the pressure within the actuator 12,14 urges the ball valve 70 more firmly against its seat face 66 further improving the seal closing off the flow passage 64 and flow of fluid from the actuator 12,14. As a result only the actuator 12,14 and isolating valve assemblies 60,62 need to be designed to withstand the possible high crash loading pressures.

It will be appreciated that other isolating valve arrangements to provide similar functionality could alternatively be used in other embodiments. The above described arrangement is though particularly advantageous and is the preferred arrangement.

The actuators 12,14 in the described embodiments comprise piston and cylinder arrangements, and this is the typical actuator arrangement used for hydraulic vehicle seat adjustment. Other actuator arrangements could of course be used in conjunction with the suitable isolating valve assemblies in accordance with the invention.

It will be appreciated that a number of further detailed modifications of the basic arrangements described and shown can be made. In addition the invention can also be applied to pneumatic adjustment systems.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A fluid powered vehicle seat adjustment system, the system comprising:
    a fluid actuator including a first inlet/outlet and a second inlet/outlet, the actuator being responsive to pressurised fluid directed to and from the first and second inlet/outlets;
    a source of pressurised fluid; and
    a controller for selectively controlling and directing pressurised fluid selectively to either the first or second inlet/outlets of the actuator;
    wherein the actuator further comprises a first actuator isolation valve associated with the first inlet/outlet of the actuator and a second actuator isolation valve associated with the second inlet/outlet of the actuator; the first and second actuator isolation valves are biassed towards a closed position to close off the respective inlet/outlets and prevent a flow of fluid from the actuator through the inlet/outlets, and open and allow a flow of fluid from the actuator via the respective inlet/outlet in response to pressurised fluid being supplied to the other inlet/outlet.

2. A fluid powered vehicle seat adjustment system as claimed in claim 1 in which the actuator isolation valves open in response to pressurised fluid supplied to the actuator isolation valves to allow a flow of fluid via the inlet/outlet into the actuator.

3. A fluid powered vehicle seat adjustment system as claimed in claim 1 in which the actuator isolation valves comprise non-return valves which are selectively operable to allow a return flow.

4. A fluid powered vehicle seat adjustment system as claimed in claim 3 in which the non-return valve of one of the first and second actuator isolation valves is selectively operated in response to pressurised fluid supplied to the other of the first and second actuator isolation valves.

5. A fluid powered vehicle seat adjustment system as claimed in claim 1 in which the actuator isolation valves are operatively interconnected.

6. A fluid powered vehicle seat adjustment system as claimed in claim 1 further comprising a interconnecting control conduit to interconnect the first and second actuator isolation valves and direct pressurised fluid supplied to one of the first and second actuator isolation valves to the other of the first and second actuator isolation valves.

7. A fluid powered vehicle seat adjustment system as claimed in claim 1 in which the actuator isolation valves each comprise a moveable valve member which is moveable from the closed position to close off the respective inlet/outlet to an open position to allow a flow of fluid via the inlet/outlet.

8. A fluid powered vehicle seat adjustment system as claimed in claim 1 in which the actuator isolation valves comprise a ball valve which seats against an annular seat surrounding the periphery of the respective inlet/outlet to close off the respective inlet/outlet.

9. A fluid powered vehicle seat adjustment system as claimed in claim 1 in which the actuator isolation valves comprise a moveable piston which moves in response to pressurised fluid supplied to the actuator to open the actuator isolation valve and allow a flow of fluid from the actuator via the inlet/outlet.

10. A fluid powered vehicle seat adjustment system as claimed in claim 1 in which each actuator isolation valve includes a biassing spring which biases the valve towards the closed position.

11. A fluid powered vehicle seat adjustment system as claimed in claim 1 in which the source of pressurised fluid comprises a fluid pump.

12. A fluid powered vehicle seat adjustment system as claimed in claim 1 in which the controller comprises at least one control valve operable by a seat occupant.

13. A fluid powered vehicle seat adjustment system as claimed in claim 1 in which the actuator comprises a piston mounted within a cylinder defining first and second actuator chambers on either side of the piston, the first and second inlet/outlets connect to the respective first and second chambers.

14. A fluid powered vehicle seat adjustment system as claimed in claim 13 in which the actuator comprises a pair of end caps attached to either end of the cylinder to close off the ends of the cylinder, the first and second inlet/outlets comprising respective conduits defined within the respective end caps, and the first and second actuator isolation valves comprising part of the respective end caps.

15. A fluid powered vehicle seat adjustment system comprising a fluid actuator which includes a pair of isolation valves, each isolation valve allowing a flow of fluid from the actuator only when pressurised fluid is supplied to the actuator.

16. A fluid powered vehicle seat adjustment system, the system comprising:
a fluid actuator including a first inlet/outlet conduit and a second inlet/outlet conduit, the actuator being responsive to pressurised hydraulic fluid directed to and from the first and second inlet/outlets by the flow controller;
a source of pressurised hydraulic fluid; and
a controller for selectively controlling and directing pressurised hydraulic fluid selectively to either the first or second inlet/outlets of the actuator; and
wherein the actuator further comprises a first actuator isolation valve associated with the first inlet/outlet of the actuator and a second actuator isolation valve associated with the second inlet/outlet of the actuator; the first and second actuator isolation valves each comprising a moveable valve member which is moveable from the closed position closing off the respective inlet/outlet to an open position allowing a flow of hydraulic fluid via the inlet/outlet, a biassing spring biasses the moveable portions towards a closed position to prevent a flow of hydraulic fluid from the actuator through the inlet/outlets, and an operating element which operates in response to pressurised hydraulic fluid supplied to the actuator to move the movable portion and open the actuator isolation valve and allow a flow of fluid from the actuator via the inlet/outlet.

17. An assembly comprising:
first and second members, wherein the first member is movably mounted relative to the second member;
a fluid actuator including:
a cylinder;
a piston slidably disposed in the cylinder, the piston and cylinder defining first and second chambers; and
a piston rod connected to the piston and the first member;
a source of pressurised fluid;
a controller in fluid communication with the source of pressurised fluid, the controller operable to selectively direct pressurised fluid from the source of pressurised fluid to the first and second chambers;
a first actuator isolation valve in fluid communication between the first chamber and the controller, the first actuator isolation valve movable between an open position permitting the flow of fluid from the controller to the first chamber, and a closed position preventing the flow of fluid between the controller and the first chamber; and
a second actuator isolation valve in fluid communication between the second chamber and the controller, the second actuator isolation valve movable between an open position permitting the flow of fluid from the controller to the second chamber, and a closed position preventing the flow of fluid between the controller and the second chamber,
wherein in response to pressurised fluid being supplied to either of the first and second isolation valves from the controller, both of the first and second actuator isolation valves are moved to their open positions to permit fluid communication between the controller and the first and second chambers.

18. The assembly of claim 17, wherein the first and second isolation valves are biased to their closed positions.

19. The assembly of claim 17 including an interconnecting control conduit to interconnect the first and second actuator isolation valves and direct pressurised fluid supplied to one of the first and second actuator isolation valves to the other of the first and second actuator isolation valves.

20. The assembly of claim 17, wherein the first member is a seat back of a vehicle seat, and the second member is a seat bottom of the vehicle seat.

* * * * *